US012095663B2

(12) United States Patent
Trujillo (10) Patent No.: US 12,095,663 B2
(45) Date of Patent: Sep. 17, 2024

(54) CONCURRENTLY SUPPORTING INTERNET PROTOCOL VERSION 6 (IPV6) AND INTERNET PROTOCOL VERSION 4 (IPV4) IN A CLOUD-MANAGED WIRELESS TELECOMMUNICATION NETWORK

(71) Applicant: DISH WIRELESS L.L.C., Englewood, CO (US)

(72) Inventor: Andrew Trujillo, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/100,506

(22) Filed: Jan. 23, 2023

(65) Prior Publication Data

US 2023/0327987 A1    Oct. 12, 2023

Related U.S. Application Data

(60) Provisional application No. 63/329,849, filed on Apr. 11, 2022.

(51) Int. Cl.
*H04L 45/64* (2022.01)
*H04L 45/741* (2022.01)
*H04W 40/02* (2009.01)

(52) U.S. Cl.
CPC ............ *H04L 45/64* (2013.01); *H04L 45/741* (2013.01); *H04W 40/02* (2013.01)

(58) Field of Classification Search
CPC ....... H04L 45/64; H04L 45/741; H04W 40/02
See application file for complete search history.

(56) References Cited

U.S. PATENT DOCUMENTS

| 10,454,823 | B1* | 10/2019 | Thomas | H04L 45/74 |
| 2016/0036943 | A1* | 2/2016 | Kish | H04L 61/4511 |
| | | | | 709/203 |
| 2018/0302367 | A1* | 10/2018 | George, IV | H04L 61/4511 |
| 2022/0279421 | A1* | 9/2022 | Sivakumar | H04W 40/248 |
| 2022/0345438 | A1* | 10/2022 | Mishra | H04L 69/325 |
| 2022/0386393 | A1* | 12/2022 | Tamvada | H04W 76/12 |
| 2023/0138602 | A1* | 5/2023 | Bregman | G06F 8/36 |
| | | | | 717/170 |

OTHER PUBLICATIONS

Yan et al. SAVI-based IPv6 source address validation implementation of the access network, Jun. 2011, IEEE, p. 1-4 (Year: 2011).*

* cited by examiner

*Primary Examiner* — Tonia L Dollinger
*Assistant Examiner* — Joseph M Cousins
(74) *Attorney, Agent, or Firm* — Kipman Tyler Werking; Frontier IP Law PLLC (57) ABSTRACT

Example embodiments are directed towards concurrently supporting IPv6 and IPv4 in a cloud-managed wireless telecommunication network. This may include electronically providing support for internet Protocol IPv4 network traffic of user equipment (UEs) in a cloud-native, O-RAN, 5G NR cellular telecommunication network, and also electronically providing support for IPv6 network traffic of UEs in the cloud-native, O-RAN, 5G NR cellular telecommunication network while concurrently providing the support IPv4 network traffic. the wireless telecommunication service provider that is an MNO of the cloud-native, O-RAN, 5G NR cellular telecommunication network controls routing of the IPv6 network traffic within a cloud computing service provider cloud in which the cloud-native, O-RAN, 5G NR cellular telecommunication network operates.

20 Claims, 6 Drawing Sheets

402 Wireless telecommunication service provider that is an MNO of the cloud-native, O-RAN, 5G NR cellular telecommunication network controlling routing of the IPv6 network traffic within a cloud computing service provider cloud

↓

404 Wireless telecommunication service provider controlling routing of the IPv4 network traffic within the cloud computing service provider cloud

```
┌─────────────────────────────────────────────────────────────┐
│ 410 Wireless telecommunication service provider that is an MNO of the
│ cloud-native, O-RAN, 5G NR cellular telecommunication network
│ controlling or performing IPv4 virtual routing and forwarding (VRF) of
│ network traffic of one or more of the UEs within a cloud computing
│ service provider cloud
└─────────────────────────────────────────────────────────────┘
```

┌─────────────────────────────────────────────────────────────┐
│ 412 Wireless telecommunication service provider that is an MNO of the
│ cloud-native, O-RAN, 5G NR cellular telecommunication network
│ controlling or performing IPv6 VRF) of network traffic of one or more of
│ the UEs within the cloud computing service provider cloud
└─────────────────────────────────────────────────────────────┘

CONCURRENTLY SUPPORTING INTERNET PROTOCOL VERSION 6 (IPV6) AND INTERNET PROTOCOL VERSION 4 (IPV4) IN A CLOUD-MANAGED WIRELESS TELECOMMUNICATION NETWORK

TECHNICAL FIELD

The present disclosure relates generally to telecommunication networks, more particularly, concurrently supporting IPv6 and IPv4 in a cloud-managed wireless telecommunication network.

BRIEF SUMMARY

The advent and implementation of Fifth Generation (5G) wireless technology has resulted in faster speeds and increased bandwidth, but to allow for a larger number of IP addresses and other advances, it is also advantageous to provide such services a cloud-native, Open Radio Access Network (O-RAN) network that concurrently supports IPv4 and IPv6 network traffic within the cloud. It is with respect to these and other considerations that the embodiments described herein have been made.

IPv4 is an IP version widely used to identify devices on a network using an addressing system. It was the first version of IP deployed for production in the ARPANET in 1983. It uses a 32-bit address scheme to store $2^{32}$ addresses which is more than 4 billion IP addresses. It is considered the primary Internet Protocol and carries 94% of Internet traffic. IPv6 is the most recent version of the Internet Protocol. This IP address version is being deployed to fulfill the need for more Internet addresses. It was aimed to resolve issues that are associated with IPv4. With a 128-bit address space, IPv6 allows for 2128 IP addresses. Thus, to provide better flexibility and support more types of network traffic and other advancements in wireless communications, it is advantageous to be able to support both IPV6 and IPV4 concurrently for the range of services provided in a cloud-managed wireless 5G telecommunication network.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Briefly described, embodiments disclosed herein are directed toward providing Internet Protocol (IP) support in a cloud-managed telecommunication network. This may include electronically providing support for IPv4 network traffic of user equipment (UEs) in a cloud-native, O-RAN, 5G NR cellular telecommunication network, and also electronically providing support for IPv6 network traffic of UEs in the cloud-native, O-RAN, 5G NR cellular telecommunication network while concurrently providing the support IPv4 network traffic.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
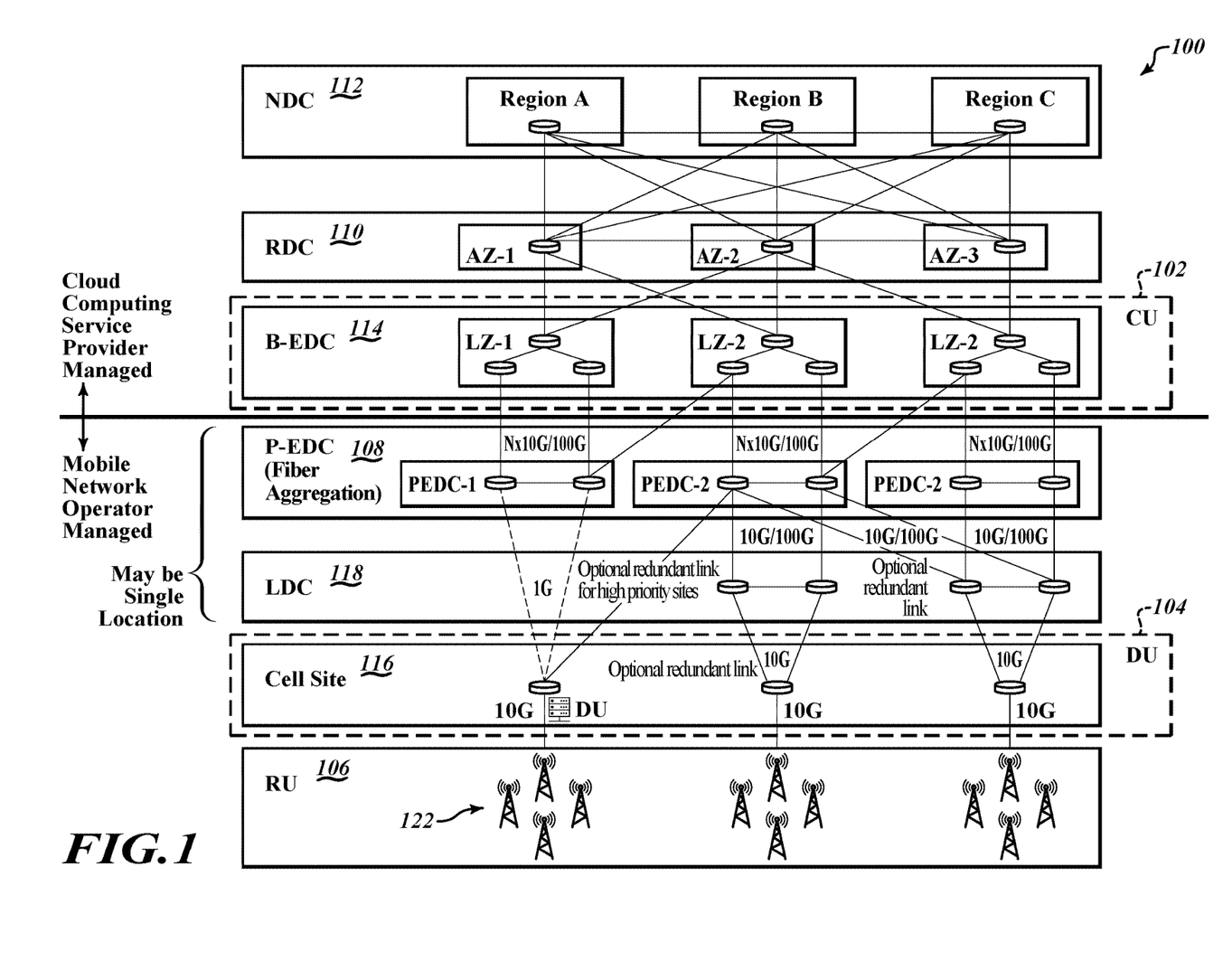
FIG. 1 illustrates a diagram of an example system architecture overview of a system in which concurrently supporting IPV6 and IPV4 in a cloud-managed wireless telecommunication network may be implemented in accordance with embodiments described herein.

FIG. 1 illustrates a diagram of an example system architecture overview of a system in which systems and methods for a P-EDC in a wireless telecommunication network may be implemented in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack.

As shown in FIG. 1, the radio unit (RU) 106 converts radio signals sent to and from the antenna of base stations 122 into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cell site 116 itself or can be hosted in an edge cloud (local data center (LDC) 118 or central office) depending on transport availability and fronthaul interface. The CU's server and relevant software may be hosted in a regional cloud data center or, as shown in FIG. 1, in a breakout edge data center (B-EDC) 114. As shown in FIG. 1, the DU 104 may be provisioned to communicate via a pass through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. The CU 102 may be connected to a regional cloud data center (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. According to various embodiments, the actual split between DU and RU may be different depending on the specific use-case and implementation.

In various embodiments, support may be provided for IPv4 and IPv6 network traffic of UEs from the RU 106, to the P-EDC 108 and B-EDC 114, as well as routing, controlled by the mobile network operator (MNO), of such IPv4 and IPv6 network traffic within the cloud computing service provider managed part of the network in the B-EDC 114, the RDC 110 and the NDC 112.

Figure 2:
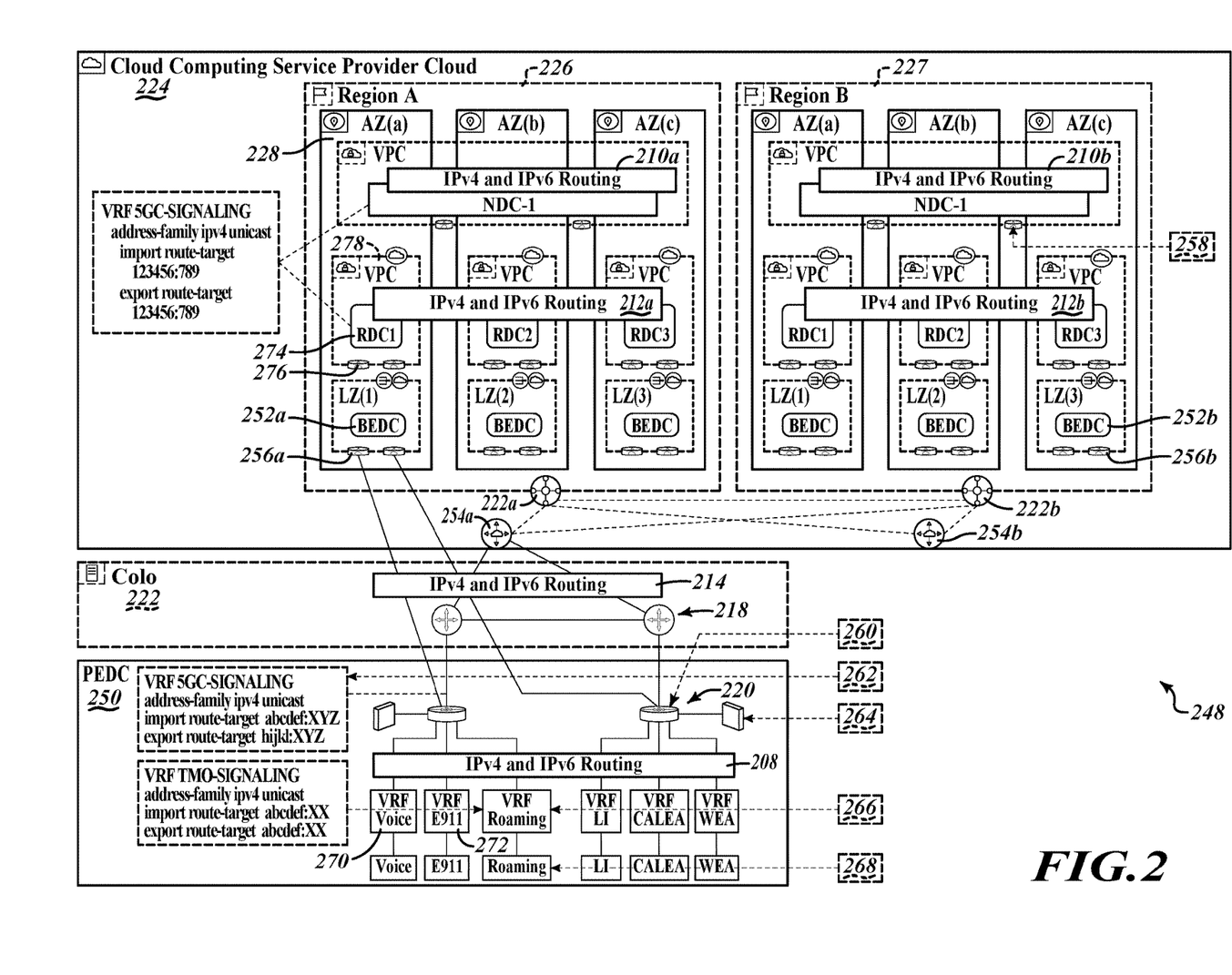
FIG. 2 is a diagram showing connectivity between certain telecommunication network components in a colocation data center and a cloud computing service provider cloud involved in concurrently supporting IPV6 and IPV4 in a cloud-managed wireless telecommunication network in accordance with embodiments described herein.

FIG. 2 is a diagram showing connectivity between certain telecommunication network components 248 in a colocation data center 222 and a cloud computing service provider cloud 224 involved in concurrently supporting IPV6 and IPV4 in a cloud-managed wireless telecommunication network in accordance with embodiments described herein.

Shown is a P-EDC 250 located in colo 222. P-EDC routers 220, which are located in colo 222, receive and aggregate telecommunication data from a plurality of cellular telecommunication radio base stations and associated DUs, such as those of cell site 116 and DU 104 of FIG. 1, of an MNO, such as a 5G NR cellular telecommunication network of a telecommunication service provider. P-EDC routers 220 may concurrently perform and/or otherwise support IPv4 and IPv6 upstream and downstream and ingress/egress cellular telecommunication traffic routing, including some or all operations regarding IPv4 and IPv6 as described herein.

For example, unique virtual routing and forwarding (VRF) roaming 266 is implemented per roaming partner or service 268. VRF is an IP-based computer network technology that enables the simultaneous co-existence of multiple virtual routers (vRouters) as instances or virtual router instances within the same router (e.g., one or more of P-EDC routers 220). (VRF) roaming may concurrently support IPv4 and IPv6 upstream and downstream and ingress/egress cellular telecommunication traffic routing 208. The roaming partner interconnect may be made using Border Gateway Protocol (BGP), for example, which is a standardized exterior gateway protocol designed to exchange routing and reachability information between autonomous systems on the Internet. To concurrently support IPv4 and IPv6 upstream and downstream and ingress/egress cellular telecommunication traffic, the telecommunication network components 248, including those in the colocation data center 222 and the cloud computing service provider cloud 224 may implement IPv6 Multiprotocol Border Gateway Protocol (MP-BGP). VRF voice 270, VRF e911 272, and other VRF services shown in FIG. 2 may also concurrently support IPv4 and IPv6 upstream and downstream and ingress/egress cellular telecommunication traffic routing 208.

VRF interworking may be performed in the firewall 264 and strict firewall rules may be implemented to control ingress/egress telecommunication traffic. The VRF is mapped to corresponding VRF via mappings 262 based on the Service/Access required. The telecommunication traffic will be "marked" 260 with an extended BGP community that identifies the location and type.

One or more P-EDC routers 220 may transmit the telecommunication traffic to one or more physical routers (direct connect routers 218) of a B-EDC (e.g., B-EDC 252a) of a cloud computing service provider cloud 224. Direct connect routers 218 may concurrently perform and/or otherwise support IPv4 and IPv6 upstream and downstream and ingress/egress cellular telecommunication traffic routing 214, including some or all operations regarding IPv4 and IPv6 as described herein. In the present example embodiment, the transmission of such telecommunication data is made via connections including a fiber optic cable 216 directly connecting one of the P-EDC routers 220 to a corresponding one of the direct connect routers 218 the B-EDC 252a. One or more vRouters 256a may be implemented via or correspond to one or more of the direct connect routers 218. The vRouters 256a may be connected to a direct connect gateway 254a that connects to the data centers of Region A 226 via a corresponding direct connect gateway 222a. In various embodiments, there may be additional regions, such as Region B 227. Region 227 may also include one or more B-EDCs implementing one or more implementing vRouters, such as B-EDC 252b implementing vRouters 256b. The vRouters described herein, including vRouters 256a and vRouters 256b, may concurrently perform and/or otherwise support IPv4 and IPv6 upstream and downstream and ingress/egress cellular telecommunication traffic routing at the B-EDC 252a and B-EDC 252b, respectively, including some or all operations regarding IPv4 and IPv6 as described herein.

In an example embodiment, data centers within Region A 226 may include vRouters, such a vRouters 276 of regional data center RDC1 274, that may concurrently perform and/or otherwise support IPv4 and IPv6 upstream and downstream and ingress/egress cellular telecommunication traffic routing at the regional data center level 212a and the national data center level 210a within the respective virtual private cloud (VPC) of the cloud computing service provider cloud 224. Such routing may be performed or controlled by the wireless telecommunication service provider that is a mobile network operator (MNO) of the cloud-native, O-RAN, 5G NR cellular telecommunication network implemented in the cloud computing service provider cloud 224. Additionally, data centers within Region B 227 may also include vRouters that may concurrently perform and/or otherwise support IPv4 and IPv6 upstream and downstream and ingress/egress cellular telecommunication traffic routing at the regional data center level 212b and the national data center level 210b within the respective virtual private cloud (VPC) of the cloud computing service provider cloud 224. Such routing may also be performed or controlled by the wireless telecommunication service provider that is the MNO of the cloud-native, O-RAN, 5G NR cellular telecommunication network implemented in the cloud computing service provider cloud 224.

The direct connect gateway 254a that connects to the data centers of Region A 226 may also connect for redundancy and failover purposes to routers of Region B 227 via a corresponding direct connect gateway 222a. Direct connect gateway 254b, which may also connect another corresponding P-EDC, also connects to the data centers of Region B 227 via direct connect gateway 222b. At the desired data center router (e.g., data center router vRouter 258), telecommunication traffic is matched based on BGP extended community and prioritized. The direct connect gateway 254a, direct connect gateway 254b, direct connect gateway 222a and direct connect gateway 222b may concurrently perform and/or otherwise support IPv4 and IPv6 upstream and downstream and ingress/egress cellular telecommunication traffic routing, including some or all operations regarding IPv4 and IPv6 as described herein.

In an example embodiment, local gateway (LGW) route table is implemented for routing to transit gateway (TGW) (to reach RDCs) via direct connect gateway 254a, which may concurrently support control of IPv4 and IPv6 network traffic by the telecommunication service provider. Connections may be AWS Elastic Network Interface (ENI) xENI connections (e.g., in VMware® Cloud on Amazon Web Services (AWS) Compute virtual machines (VM)) from direct connect VPC 278 for GRE tunneling, 5G N2 interface functionality (which connects the gNodeB to the Access and Mobility Management Function, or AMF), 5G N3 interface functionality (which connects the gNodeB (RAN) to the 5G User Plane Function (UPF) implemented in the cloud 224), operations, administration and maintenance (OAM), signaling, etc., which may all concurrently support control of IPv4 and IPv6 network traffic by the telecommunication service provider. The UPF advertises the Internet Protocol (IP) pool to virtual routers over the 5G N6 interface (public IUP address), which may concurrently support control of IPv4 and IPv6 network traffic by the telecommunication service provider. Static routes and ENI based routing route traffic to the 5G N6 interface on virtual routers (vRouters), which may all concurrently support control of IPv4 and IPv6 network traffic by the telecommunication service provider. Ingress routing is enabled to route the assigned IP Public/23 to the LGW, which may concurrently support control of IPv4 and IPv6 network traffic by the telecommunication service provider. A domain name service (DNS) resolver may be provisioned in the RDC (e.g., RDC1 274) and is attached to a 5G N6 interface, but may be replaced with an on-premises, cloud-native core networking security service platform (e.g., such as that from Infoblox®) in the B-EDC 252a, which may concurrently support control of IPv4 and IPv6 network traffic by the telecommunication service provider.

Figure 3:
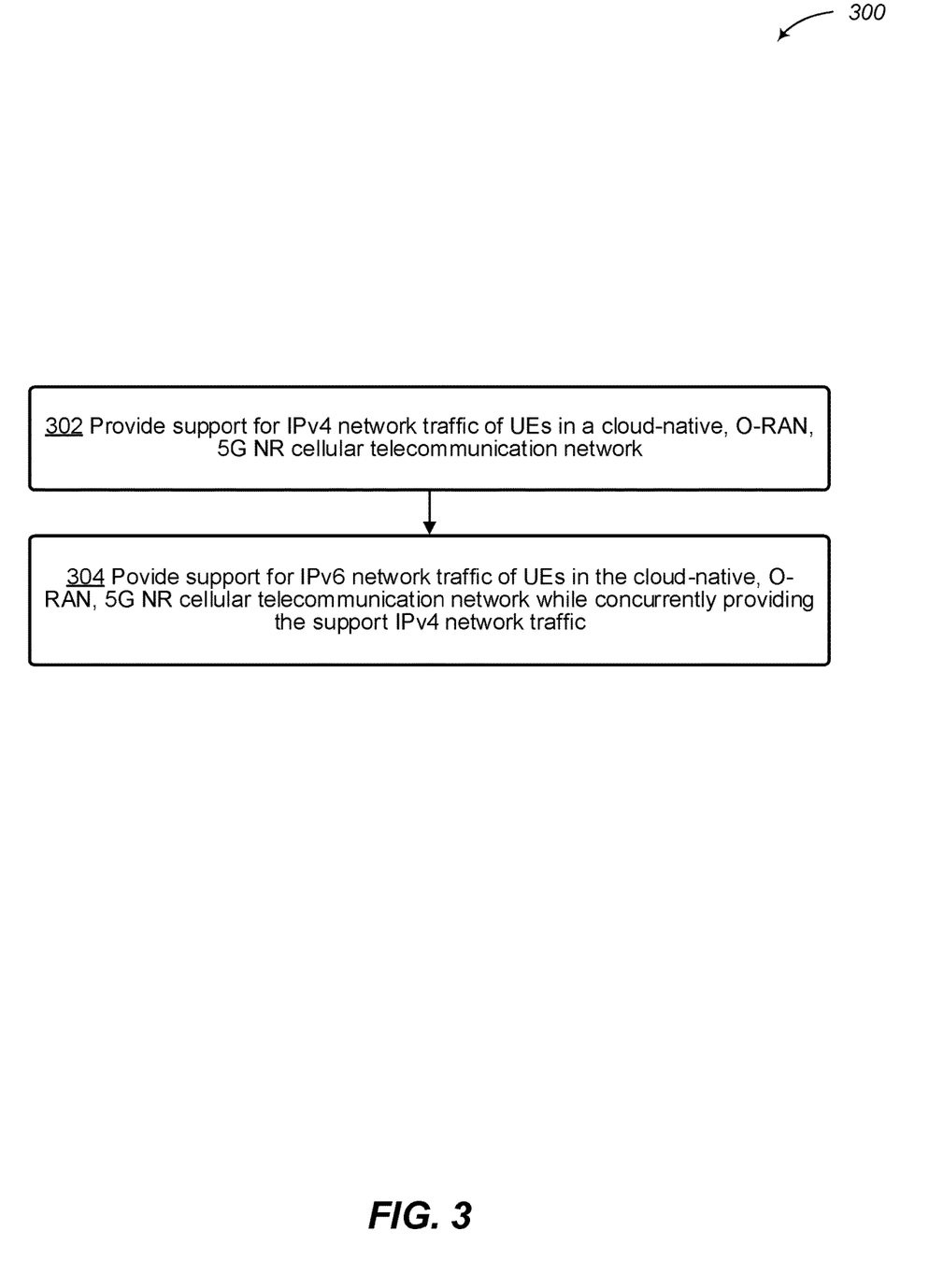
FIG. 3 illustrates a logical flow diagram showing an example embodiment of a process for concurrently supporting IPV6 and IPV4 in a cloud-managed wireless telecommunication network in accordance with embodiments described herein.

FIG. 3 illustrates a logical flow diagram showing an example embodiment of a process 300 for concurrently supporting IPV6 and IPV4 in a cloud-managed wireless telecommunication network in accordance with embodiments described herein.

At 302, the system 100 electronically provides support for internet Protocol Version 4 (IPv4) network traffic of user equipment (UEs) in a cloud-native, Open Radio Access Network (O-RAN), fifth-generation New Radio (5G NR) cellular telecommunication network.

At 304, the system 100 electronically provides support for internet Protocol Version 6 (IPv6) network traffic of UEs in the cloud-native, O-RAN, 5G NR cellular telecommunication network while concurrently providing the support IPv4 network traffic in the cloud-native, O-RAN, 5G NR cellular telecommunication network.

In an example embodiment, support for IPv6 network traffic in the cloud-native, O-RAN, 5G NR cellular telecommunication network while concurrently providing the support IPv4 network traffic in the cloud-native, O-RAN, 5G NR cellular telecommunication network includes enabling IPv4 and IPv6 addresses in physical and/or virtual routers of the O-RAN, 5G NR cellular telecommunication network. In one embodiment, the system may utilize a dual-stacked physical or virtual network device in the O-RAN, 5G NR cellular telecommunication network. In particular, in cases when the dual-stacked network device queries a name of a destination and a Domain Name Service (DNS) responds with an IPv4 address, then the dual-stacked network device sends IPv4 packets. In cases when the dual-stacked network device queries a name of a destination and the DNS responds with an IPv6 address, then the dual-stacked network device sends IPv6 packets.

In an example embodiment, the providing support for IPv6 network traffic in the cloud-native, O-RAN, 5G NR cellular telecommunication network while concurrently providing the support IPv4 network traffic in the cloud-native, O-RAN, 5G NR cellular telecommunication network includes a wireless telecommunication service provider that is a mobile network operator (MNO) of the cloud-native, O-RAN, 5G NR cellular telecommunication network controlling or performing network address translation (NAT) of network traffic of the UEs traffic within a cloud computing service provider cloud in which the cloud-native, O-RAN, 5G NR cellular telecommunication network operates to concurrently provide support for IPv4 and IPv6 network traffic in the cloud-native, O-RAN, 5G NR cellular telecommunication network.

In an example embodiment, the providing support for IPv6 network traffic in the cloud-native, O-RAN, 5G NR cellular telecommunication network while concurrently providing the support IPv4 network traffic in the cloud-native, O-RAN, 5G NR cellular telecommunication network includes a wireless telecommunication service provider that is a mobile network operator (MNO) of the cloud-native, O-RAN, 5G NR cellular telecommunication network controlling or performing IPv6 address validation of network traffic of the UEs within a cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network.

In an example embodiment, the providing support for IPv6 network traffic in the cloud-native, O-RAN, 5G NR cellular telecommunication network while concurrently providing the support IPv4 network traffic in the cloud-native, O-RAN, 5G NR cellular telecommunication network includes a wireless telecommunication service provider that is a mobile network operator (MNO) of the cloud-native, O-RAN, 5G NR cellular telecommunication network controlling or performing IPv4 address optimization of network traffic of the UEs within a cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network.

In an example embodiment, the wireless telecommunication service provider controls or performs routing of IPv6 network traffic of one or more of the UEs according to IPv6 Multiprotocol Border Gateway Protocol (MP-BGP) within a cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network. The wireless telecommunication service provider controls or performs routing of IPv4 network traffic of one or more of the UEs according to IPv4 Multiprotocol Border Gateway Protocol (MP-BGP) within the cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network.

In an example embodiment, the providing support for IPv6 network traffic in the cloud-native, O-RAN, 5G NR cellular telecommunication network while concurrently providing the support IPv4 network traffic in the cloud-native, O-RAN, 5G NR cellular telecommunication network includes integrating IPv6 support in a continuous integration and continuous delivery (CI/CD) component across the cloud-native, O-RAN, 5G NR cellular telecommunication network.

Figure 4A:
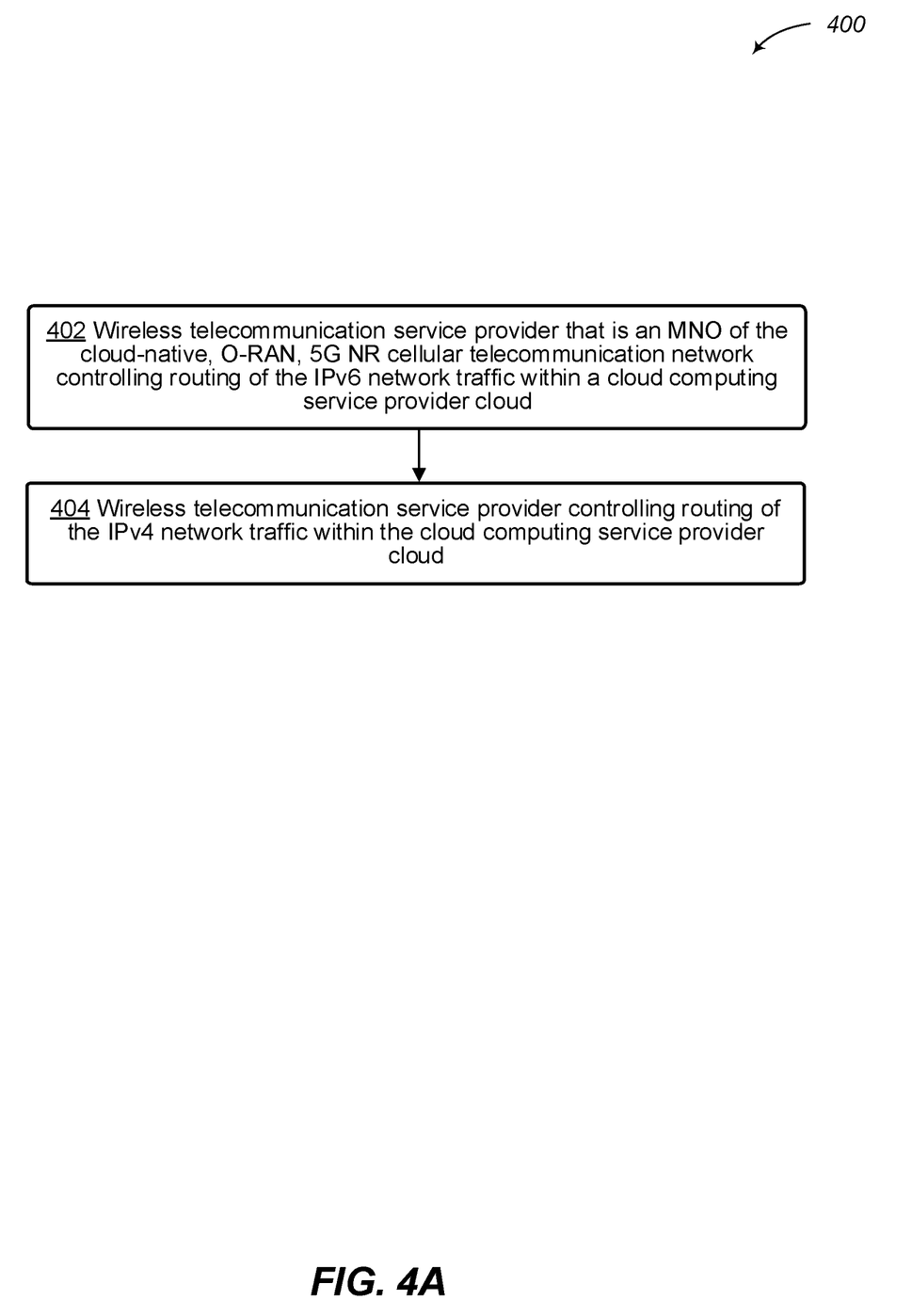
FIG. 4A illustrates a logical flow diagram showing an example embodiment of a process that may be involved in concurrently supporting IPV6 and IPV4 in a cloud-managed wireless telecommunication network in accordance with embodiments described herein.

FIG. 4A illustrates a logical flow diagram showing an example embodiment of a process 400 that may be involved in concurrently supporting IPV6 and IPV4 in a cloud-managed wireless telecommunication network in accordance with embodiments described herein.

At 402, the wireless telecommunication service provider that is an MNO of the cloud-native, O-RAN, 5G NR cellular telecommunication network controls routing of the IPv6 network traffic within a cloud computing service provider cloud in which the cloud-native, O-RAN, 5G NR cellular telecommunication network operates.

At 404, the wireless telecommunication service provider controls routing of the IPv4 network traffic within the cloud computing service provider cloud in which the cloud-native, O-RAN, 5G NR cellular telecommunication network operates.

Figure 4B:
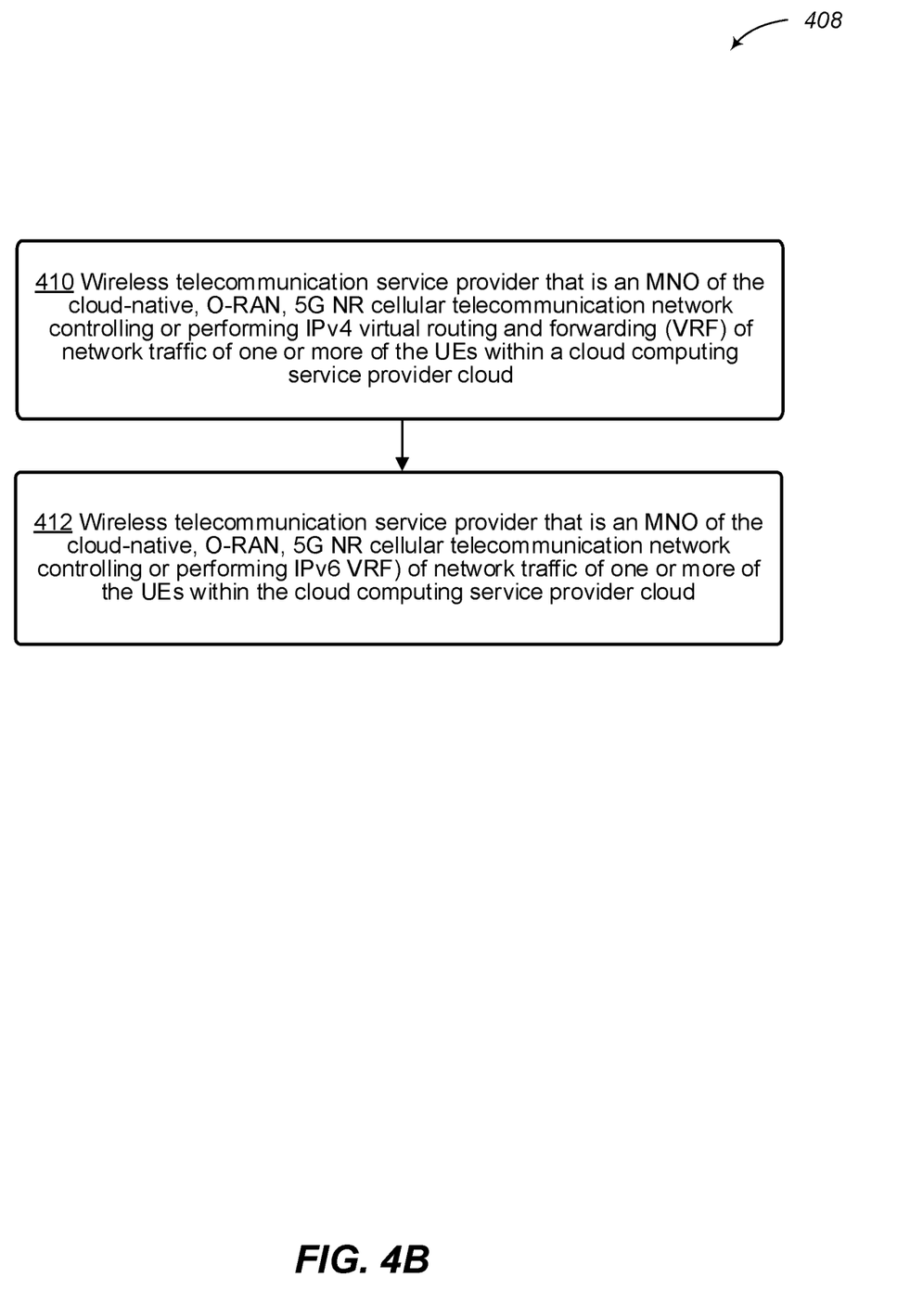
FIG. 4B illustrates a logical flow diagram showing an example embodiment of another process that may be involved in concurrently supporting IPV6 and IPV4 in a cloud-managed wireless telecommunication network in accordance with embodiments described herein.

FIG. 4B illustrates a logical flow diagram showing an example embodiment of another process 408 that may be involved in concurrently supporting IPV6 and IPV4 in a cloud-managed wireless telecommunication network in accordance with embodiments described herein.

At 410, the a wireless telecommunication service provider controls or performs IPv4 virtual routing and forwarding (VRF) of network traffic of one or more of the UEs within a cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network.

At 412, the a wireless telecommunication service provider controls or performing IPv6 VRF of network traffic of one or more of the UEs within the cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network.

Figure 5:
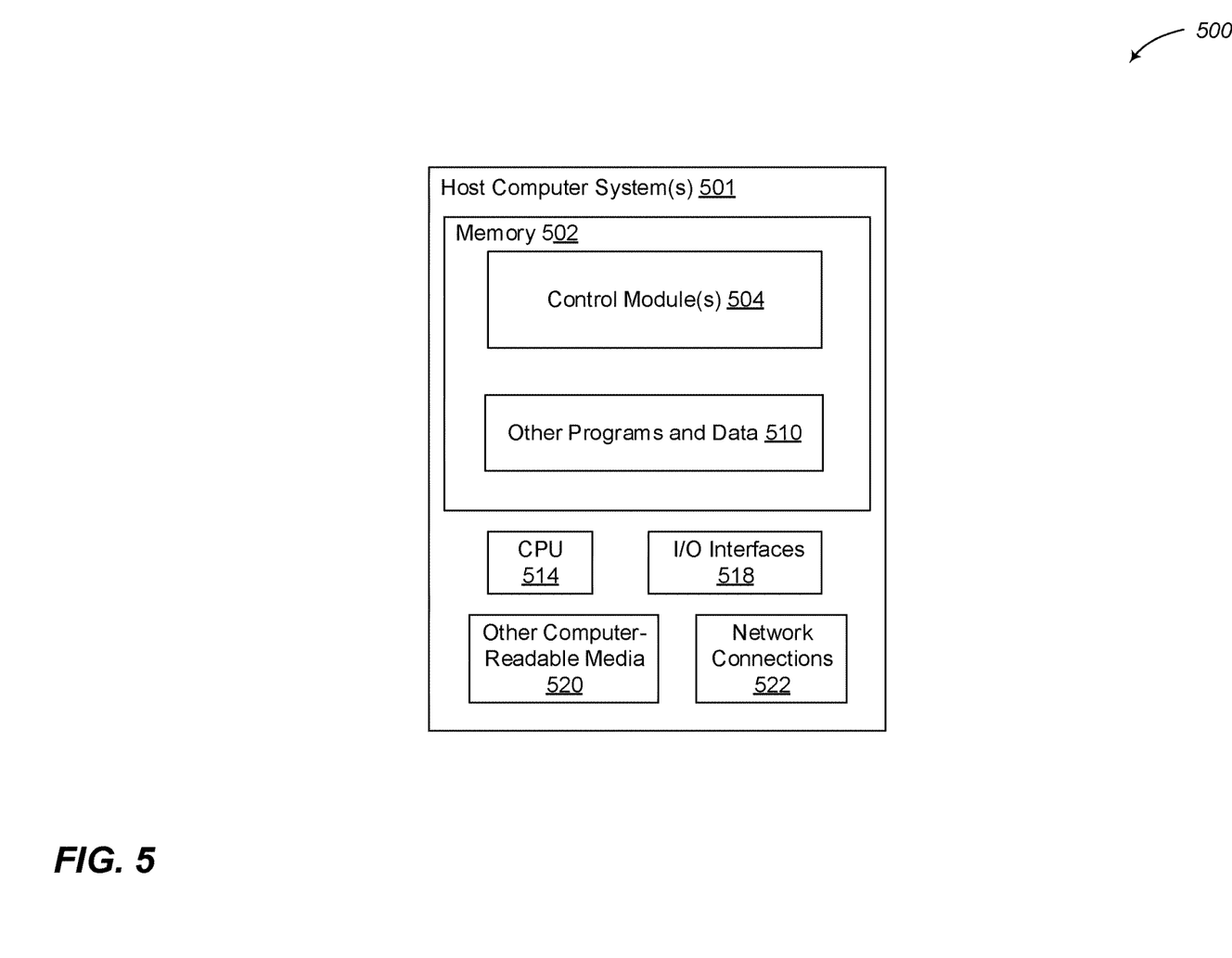
FIG. 5 shows a system diagram that describes an example implementation of a computing system(s) for implementing embodiments described herein.

FIG. 5 shows a system diagram that describes an example implementation of a computing system or systems 500 for implementing embodiments described herein.

The functionality described herein for concurrently supporting IPV6 and IPV4 in a cloud-managed wireless telecommunication network, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 5 illustrates an example of underlying hardware on which such software and functionality may be hosted and/or implemented.

In particular, shown is example host computer system(s) 501. For example, such computer system(s) 501 may represent one or more of those in various data centers, base stations and cell sites shown and/or described herein that are, or that host or implement the functions of: routers, components, microservices, virtual machines, and other aspects described herein to implement concurrently supporting IPV6 and IPV4 in a cloud-managed wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein to concurrently supporting IPV6 and IPV4 in a cloud-managed wireless telecommunication network. Memory 502 may also store other programs and data 510, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing Internet Protocol (IP) support in a cloud-managed telecommunication network comprising:
   electronically providing support for Internet Protocol Version 4 (IPv4) network traffic of user equipment (UEs) in a cloud-native, Open Radio Access Network (O-RAN), fifth-generation New Radio (5G NR) cellular telecommunication network, by at least enabling IPv4 addresses in physical and virtual routers of the O-RAN, 5G NR cellular telecommunication network; and
   electronically providing support for Internet Protocol Version 6 (IPv6) network traffic of UEs in the cloud-native, O-RAN, 5G NR cellular telecommunication network while concurrently providing the support for IPV4 network traffic in the cloud-native, O-RAN, 5G NR cellular telecommunication network, by at least:
   enabling IPv6 addresses in physical and virtual routers of the O-RAN, 5G NR cellular telecommunication network;
   utilizing a dual-stacked physical or virtual network device in the O-RAN, 5G NR cellular telecommunication network wherein:
   in cases when the dual-stacked network device queries a name of a destination and a Domain Name Service (DNS) responds with an IPV4 address, then the dual-stacked network device sends IPv4 packets; and
   in cases when the dual-stacked network device queries a name of a destination and the DNS responds with an IPV6 address, then the dual-stacked network device sends IPV6 packets,
   wherein:
   electronically providing support for both Internet Protocol Version 4 and Internet Protocol version 6 network traffic of user equipment in the cloud-native, Open Radio Access Network, fifth-generation New Radio cellular telecommunication network comprises a mobile network operator of the cloud-native, Open Radio Access Network, fifth-generation New Radio cellular telecommunication network connecting at least one first vRouter concurrently supporting IPv4 and IPv6 upstream and downstream cellular telecommunication traffic routing at the nation data center level of the cloud-native, Open Radio Access Network, fifth-generation New Radio cellular telecommunication network with at least one second vRouter concurrently supporting IPv4 and IPv6 upstream and downstream cellular telecommunication traffic routing at the regional data center level of the cloud-native, Open Radio Access Network, fifth-generation New Radio cellular telecommunication network.

2. The method of claim 1 wherein the providing support for IPV6 network traffic in the cloud-native, O-RAN, 5G NR cellular telecommunication network while concurrently providing the support for IPV4 network traffic in the cloud-native, O-RAN, 5G NR cellular telecommunication network includes:
   a wireless telecommunication service provider that is a mobile network operator (MNO) of the cloud-native, O-RAN, 5G NR cellular telecommunication network controlling routing of the IPV6 network traffic within a cloud computing service provider cloud in which the cloud-native, O-RAN, 5G NR cellular telecommunication network operates; and
   the wireless telecommunication service provider controlling routing of the IPV4 network traffic within the cloud computing service provider cloud in which the cloud-native, O-RAN, 5G NR cellular telecommunication network operates.

3. The method of claim 1 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
   a wireless telecommunication service provider that is a mobile network operator (MNO) of the cloud-native, O-RAN, 5G NR cellular telecommunication network controlling or performing network address translation (NAT) of network traffic of the UEs traffic within a cloud computing service provider cloud in which the cloud-native, O-RAN, 5G NR cellular telecommunication network operates to concurrently provide support for IPV4 and IPV6 network traffic in the cloud-native, O-RAN, 5G NR cellular telecommunication network.

4. The method of claim 1 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
   a wireless telecommunication service provider that is a mobile network operator (MNO) of the cloud-native, O-RAN, 5G NR cellular telecommunication network controlling or performing IPv6 address validation of network traffic of the UEs within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

5. The method of claim 1 wherein the providing support for IPV6 network traffic in the cloud-native, O-RAN, 5G NR cellular telecommunication network while concurrently providing the support in for IPV4 network traffic in the cloud-native, O-RAN, 5G NR cellular telecommunication network includes:
 a wireless telecommunication service provider that is a mobile network operator (MNO) of the cloud-native, O-RAN, 5G NR cellular telecommunication network controlling or performing IPv4 address optimization of network traffic of the UEs within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

6. The method of claim 1 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
 a wireless telecommunication service provider that is a mobile network operator (MNO) of the cloud-native, O-RAN, 5G NR cellular telecommunication network controlling or performing IPv4 virtual routing and forwarding (VRF) of network traffic of one or more of the UEs within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network; and
 the wireless telecommunication service provider controlling or performing IPV6 VRF of network traffic of one or more of the UEs within the cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

7. The method of claim 1 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
 a wireless telecommunication service provider that is a mobile network operator (MNO) of the cloud-native, O-RAN, 5G NR cellular telecommunication network controlling or performing routing of IPV6 network traffic of one or more of the UEs according to IPv6 Multiprotocol Border Gateway Protocol (MP-BGP) within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network; and
 the wireless telecommunication service provider controlling or performing routing of IPV4 network traffic of one or more of the UEs according to IPv4 Multiprotocol Border Gateway Protocol (MP-BGP) within the cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

8. The method of claim 1, wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
 integrating IPv6 support in a continuous integration and continuous delivery (CI/CD) component across the cloud-native, O-RAN, 5G NR cellular telecommunication network.

9. A non-transitory computer-readable storage medium having computer-executable instructions stored thereon that, when executed by at least one processor, cause the at least one processor to cause actions to be performed, the actions including:
 electronically providing support for Internet Protocol Version 4 (IPv4) network traffic of user equipment (UEs) in a cloud-native, Open Radio Access Network (O-RAN), fifth-generation New Radio (5G NR) cellular telecommunication network; and
 electronically providing support for Internet Protocol Version 6 (IPv6) network traffic of UEs in the cloud-native, O-RAN, 5G NR cellular telecommunication network while concurrently providing the support for IPv4 network traffic in the cloud-native, O-RAN, 5G NR cellular telecommunication network;
 wherein;
 electronically providing support for both Internet Protocol Version 4 and Internet Protocol version 6 network traffic of user equipment in the cloud-native, Open Radio Access Network, fifth-generation New Radio cellular telecommunication network comprises a mobile network operator of the cloud-native, Open Radio Access Network, fifth-generation New Radio cellular telecommunication network connecting at least one first vRouter concurrently supporting IPv4 and IPv6 upstream and downstream cellular telecommunication traffic routing at the nation data center level of the cloud-native, Open Radio Access Network, fifth-generation New Radio cellular telecommunication network with at least one second vRouter concurrently supporting IPv4 and IPv6 upstream and downstream cellular telecommunication traffic routing at the regional data center level of the cloud-native, Open Radio Access Network, fifth-generation New Radio cellular telecommunication network.

10. The non-transitory computer-readable storage medium of claim 9 wherein the providing support for IPv6 network traffic in the cloud-native, O-RAN, 5G NR cellular telecommunication network while concurrently providing the support for IPv4 network traffic in the cloud-native, O-RAN, 5G NR cellular telecommunication network includes:
 a wireless telecommunication service provider that is a mobile network operator (MNO) of the cloud-native, O-RAN, 5G NR cellular telecommunication network controlling routing of the IPv6 network traffic within a cloud computing service provider cloud in which the cloud-native, O-RAN, 5G NR cellular telecommunication network operates; and the wireless telecommunication service provider controlling routing of the IPV4 network traffic within the cloud computing service provider cloud in which the cloud-native, O-RAN, 5G NR cellular telecommunication network operates.

11. The non-transitory computer-readable storage medium of claim 9 wherein the providing support for IPv6 network traffic in the cloud-native, O-RAN, 5G NR cellular telecommunication network while concurrently providing the support for IPv4 network traffic in the cloud-native, O-RAN, 5G NR cellular telecommunication network includes:

a wireless telecommunication service provider that is a mobile network operator (MNO) of the cloud-native, O-RAN, 5G NR cellular telecommunication network controlling or performing network address translation (NAT) of network traffic of the UEs traffic within a cloud computing service provider cloud in which the cloud-native, O-RAN, 5G NR cellular telecommunication network operates to concurrently provide support for IPv4 and IPv6 network traffic in the cloud-native, O-RAN, 5G NR cellular telecommunication network.

12. The non-transitory computer-readable storage medium of claim 9 wherein the providing support for IPv6 network traffic in the cloud-native, O-RAN, 5G NR cellular telecommunication network while concurrently providing the support for IPv4 network traffic in the cloud-native, O-RAN, 5G NR cellular telecommunication network includes:

a wireless telecommunication service provider that is a mobile network operator (MNO) of the cloud-native, O-RAN, 5G NR cellular telecommunication network controlling or performing IPv6 address validation of network traffic of the UEs within a cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPv4 network traffic in the cloud-native, O-RAN, 5G NR cellular telecommunication network.

13. A system for transmitting telecommunication data, the system comprising:

at least one memory that stores computer executable instructions; and at least one processor that executes the computer executable instructions to cause actions to be performed, the actions including:

electronically providing support for Internet Protocol Version 4 (IPv4) network traffic of user equipment (UEs) in a cloud-native, Open Radio Access Network (O-RAN), fifth-generation New Radio (5G NR) cellular telecommunication network; and electronically providing support for Internet Protocol Version 6 (IPv6) network traffic of UEs in the cloud-native, O-RAN, 5G NR cellular telecommunication network while concurrently providing the support for IPv4 network traffic in the cloud-native, O-RAN, 5G NR cellular telecommunication network;

wherein:

electronically providing support for both Internet Protocol Version 4 and Internet Protocol version 6 network traffic of user equipment in the cloud-native, Open Radio Access Network, fifth-generation New Radio cellular telecommunication network comprises a mobile network operator of the cloud-native, Open Radio Access Network, fifth-generation New Radio cellular telecommunication network connecting at least one first vRouter concurrently supporting IPv4 and IPv6 upstream and downstream cellular telecommunication traffic routing at the nation data center level of the cloud-native, Open Radio Access Network, fifth-generation New Radio cellular telecommunication network with at least one second vRouter concurrently supporting IPv4 and IPv6 upstream and downstream cellular telecommunication traffic routing at the regional data center level of the cloud-native, Open Radio Access Network, fifth-generation New Radio cellular telecommunication network.

14. The system of claim 13 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:

a wireless telecommunication service provider that is a mobile network operator (MNO) of the cloud-native, O-RAN, 5G NR cellular telecommunication network controlling routing of the IPV6 network traffic within a cloud computing service provider cloud in which the cloud-native, O-RAN, 5G NR cellular telecommunication network operates; and the wireless telecommunication service provider controlling routing of the IPV4 network traffic within the cloud computing service provider cloud in which the cloud-native, O-RAN, 5G NR cellular telecommunication network operates.

15. The system of claim 13 wherein the providing support for IPV6 network traffic in the cloud-native, O-RAN, 5G NR cellular telecommunication network while concurrently providing the support for IPV4 network traffic in the cloud-native, O-RAN, 5G NR cellular telecommunication network includes:

a wireless telecommunication service provider that is a mobile network operator (MNO) of the cloud-native, O-RAN, 5G NR cellular telecommunication network controlling or performing network address translation (NAT) of network traffic of the UEs traffic within a cloud computing service provider cloud in which the cloud-native, O-RAN, 5G NR cellular telecommunication network operates to concurrently provide support for IPV4 and IPV6 network traffic in the cloud-native, O-RAN, 5G NR cellular telecommunication network.

16. The system of claim 13 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:

a wireless telecommunication service provider that is a mobile network operator (MNO) of the cloud-native, O-RAN, 5G NR cellular telecommunication network controlling or performing IPv6 address validation of network traffic of the UEs within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPv4 network traffic in the cloud-native, O-RAN, 5G NR cellular telecommunication network.

17. The system of claim 13 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
  a wireless telecommunication service provider that is a mobile network operator (MNO) of the cloud-native, O-RAN, 5G NR cellular telecommunication network controlling or performing IPv4 address optimization of network traffic of the UEs within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

18. The system of claim 13 wherein the providing support for IPV6 network traffic in the cloud-native, O-RAN, 5G NR cellular telecommunication network while concurrently providing the support for IPV4 network traffic in the cloud-native, O-RAN, 5G NR cellular telecommunication network includes:
  a wireless telecommunication service provider that is a mobile network operator (MNO) of the cloud-native, O-RAN, 5G NR cellular telecommunication network controlling or performing IPv4 virtual routing and forwarding (VRF) of network traffic of one or more of the UEs within a cloud computing service provider cloud in which the cloud-native, O-RAN, 5G NR cellular telecommunication network operates to provide support for IPv6 network traffic in the cloud-native, O-RAN, 5G NR cellular telecommunication network while concurrently providing the support for IPV4 network traffic in the cloud-native, O-RAN, 5G NR cellular telecommunication network; and
  the wireless telecommunication service provider controlling or performing IPv6 VRF of network traffic of one or more of the UEs within the cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

19. The system of claim 13 wherein the providing support for IPV6 network traffic in the cloud-native, O-RAN, 5G NR cellular telecommunication network while concurrently providing the support for IPv4 network traffic in the cloud-native, O-RAN, 5G NR cellular telecommunication network includes:
  a wireless telecommunication service provider that is a mobile network operator (MNO) of the cloud-native, O-RAN, 5G NR cellular telecommunication network controlling or performing routing of IPV6 network traffic of one or more of the UEs according to IPV6 Multiprotocol Border Gateway Protocol (MP-BGP) within a cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network; and
  the wireless telecommunication service provider controlling or performing routing of IPV4 network traffic of one or more of the UEs according to IPv4 Multiprotocol Border Gateway Protocol (MP-BGP) within the cloud computing service provider cloud in which the cloud-native, O-RAN, 5G NR cellular telecommunication network operates to provide support for IPV6 network traffic in the cloud-native, O-RAN, 5G NR cellular telecommunication network while concurrently providing the support for IPV4 network traffic in the cloud-native, O-RAN, 5G NR cellular telecommunication network.

20. The system of claim 13, wherein the providing support for IPv6 network traffic in the cloud-native, O-RAN, 5G NR cellular telecommunication network while concurrently providing the support for IPv4 network traffic in the cloud-native, O-RAN, 5G NR cellular telecommunication network includes:
  integrating IPv6 support in a continuous integration and continuous delivery (CI/CD) component across the cloud-native, O-RAN, 5G NR cellular telecommunication network.

* * * * *

UNITED STATES PATENT AND TRADEMARK OFFICE
CERTIFICATE OF CORRECTION

| | | |
|---|---|---|
| PATENT NO. | : 12,095,663 B2 | |
| APPLICATION NO. | : 18/100506 | |
| DATED | : September 17, 2024 | |
| INVENTOR(S) | : Andrew Trujillo | |

It is certified that error appears in the above-identified patent and that said Letters Patent is hereby corrected as shown below:

In the Claims

Claim 1, Column 12:
Line 7: "nation" should be --national--

Claim 9, Column 14:
Line 50: "nation" should be --national--

Claim 13, Column 16:
Line 11: "nation" should be --national--

Signed and Sealed this
Twelfth Day of November, 2024

Katherine Kelly Vidal
*Director of the United States Patent and Trademark Office*